Figure 1:
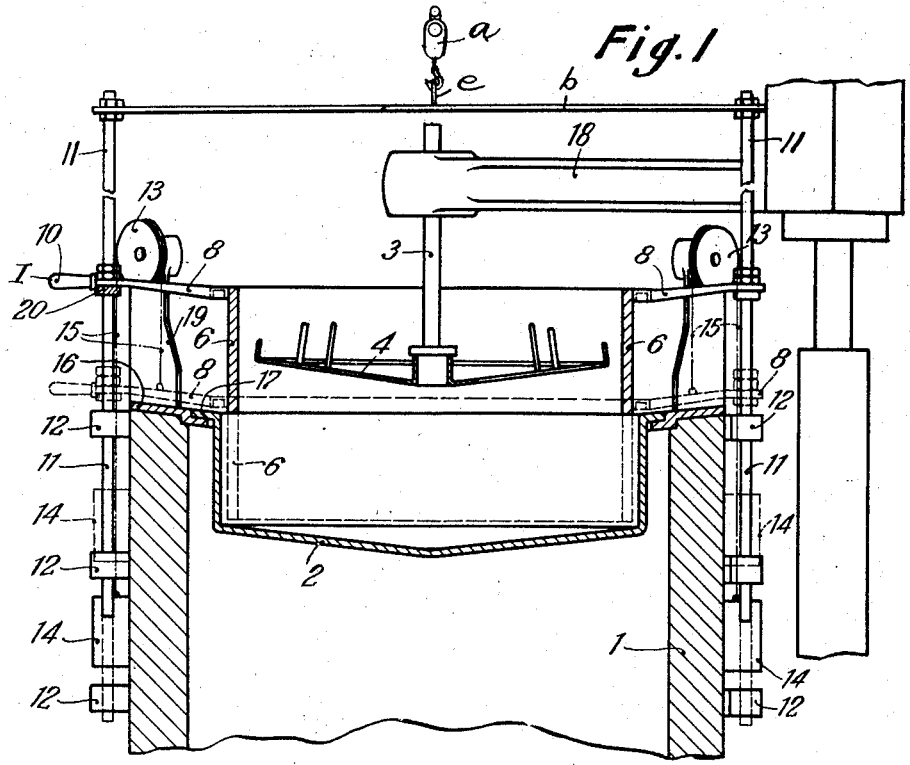

June 5, 1934. B. NIER 1,961,301
APPARATUS FOR COATING OBJECTS WITH A LIQUID
Filed June 11, 1932

B. Nier
INVENTOR

By: Marks & Clerk
ATTYS

Patented June 5, 1934

1,961,301

UNITED STATES PATENT OFFICE 1,961,301

APPARATUS FOR COATING OBJECTS WITH A LIQUID

Bruno Nier, Beierfeld, Germany

Application June 11, 1932, Serial No. 616,723
In Germany May 17, 1930

5 Claims. (Cl. 91—42)

My invention relates to an apparatus for coating objects with a liquid, for instance, tinning them.

It is an object of my invention to facilitate the recovery of the excess liquid which does not adhere to the coated objects.

To this end, in combination with a tank for the coating liquid, for instance, molten tin, and a rotary support for the objects to be coated from which the excess liquid is hurled away by centrifugal action, I provide a baffle for intercepting the excess liquid.

Tinning is very important for the manufacture of metal objects of many kinds which are protected from rust by the coating of tin. In quantity production, for instance, in the manufacture of wind lanterns and similar objects, the commercial adaptability of tinning is often determined by the possibility of performing it under economic conditions because tin is comparatively expensive and the tinning process itself also involves some cost.

The tinning, for instance, of wind lanterns, is frequently performed by immersing the objects in a bath of molten tin and removing the excess tin by centrifugal action. The objects to be tinned are immersed by means of a rotary support which is then rotated.

In the tinning processes as performed heretofore the loss of tin is high. This drawback is eliminated according to my invention.

In a preferred embodiment of my invention I provide a movable annular baffle and rotate the rotary support, with the objects thereon, in the baffle after it has been lifted out of the bath. The tin which separates from the objects by centrifugal action, is intercepted by the baffle and splashing loss is avoided.

The movable baffle is preferably adapted to be immersed in the molten tin bath by hand or by mechanical means so that the tin adhering to it is remelted in the bath.

The saving of tin effected by my method is very considerable.

Results will be particularly favorable if the baffle is subdivided into elements which partly overlap, with air spaces between them, like a Venetian blind. The air expelled by the tin as it strikes the baffle is not entrapped which might cause rejection of tin to the articles on the rotary support, but flows away between the baffle elements. The baffle elements must be so positioned with respect to each other that all the tin is retained by the baffle elements and the fine tin dust is not entrained by the flowing air.

In the accompanying drawing an apparatus embodying my invention as applied to tinning, is illustrated by way of example.

In the drawing

Figure 2:
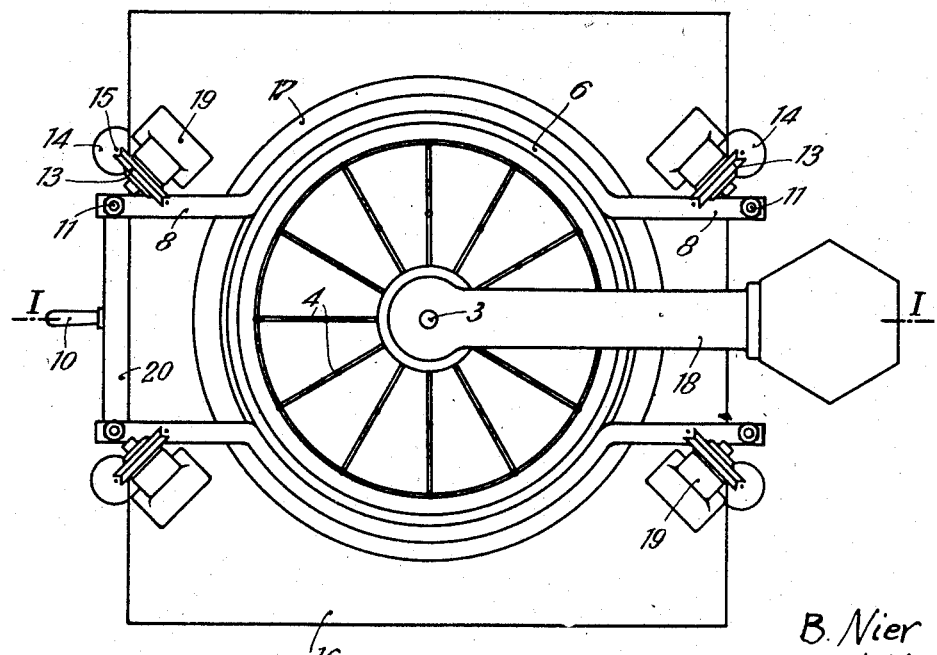

Fig 1 is a sectional elevation of the apparatus, taken on the line I—I in Fig. 2, and Fig. 2 is a plan view of the apparatus.

Referring now to the drawing, 1 is brickwork, 16 is a top plate on the brickwork, with a seat in its centre, and 2 is a tank for a molten bath of tin which is inserted in a central hole of the top plate, with a flange 17 at its upper end bearing on the seat in the top plate. 3 is a vertical shaft which is mounted to rotate and to slide in a horizontal arm or bracket 18, and 4 is a support for the objects to be tinned at the lower end of shaft 3. Rotation is imparted to the shaft 3 by any suitable means, not shown.

6 is an annular baffle the inside diameter of which is larger than the outside diameter of the support 4 and the outside diameter of which is less than the inside diameter of the tank 2. In the position shown in full lines in Fig. 1, the baffle is in its topmost position at the level of the elevated support 4 so that it will intercept the tin which flies off the objects if the support 4 is rotated. The lowermost position of the baffle is shown in dotted lines in Fig. 1. In this position of the baffle the tin which adheres to its inner wall is melted and recovered by the molten tin in the tank.

The raising and lowering of the baffle 6 is facilitated by balance weights 14. 8 is a frame having two parallel bars which are spaced apart at opposite sides of the central vertical plane of the shaft 3 and the tank 2 and partly circular, as shown in Fig. 2, for engaging the sides of the baffle 6. They may be of channel section and at one end are connected by a transverse brace 20 with a handle 10. 11 are vertical guide rods at the ends of the frame bars 8. 12 are sleeves on the brickwork 1 for guiding the bars. 19 are vertical brackets on the top plate 1. 13 are sheaves mounted to rotate at the upper ends of the brackets. 15 are ropes or cables which are attached to the bars 8 at one end, and to the balance weights 14 at the other. Conventional means is provided for raising and lowering the baffle 6, and the balance weights 14 may be dispensed with in smaller apparatus. The conventional means for raising and lowering the baffle 6 may comprise the electric winding drum $a$ hooked to the ring $e$ attached to the spider b mounted on the upper ends of the guide rods 11, which are extended for the purpose.

The operation is as follows:

Normally the baffle 6 is in its lowermost position in the tank 2 as shown in dotted lines in Fig. 1, and the shaft 3 with the support 4 is in its elevated position. The objects to be tinned are placed on the support 4 which is then lowered into the tank 2 and returned to its upper or initial position after a given time. At the same time with the support 4, or immediately after, the baffle 6 is raised and moved into the position shown in full lines in Fig. 1. The shaft 3 is now rotated and the excess tin is thrown off the support 4 and the objects thereon. The tin either flows back into the bath immediately or solidifies on the inner wall of the baffle 6 and is remelted when the baffle returns into the molten bath in tank 2.

The modification in which the baffle is designed as a built-up member with elements like those of a Venetian blind has not been illustrated but will readily be understood as to its design and function by a person skilled in the art.

I claim:

1. An apparatus for coating objects with a liquid, comprising a fixed tank for the liquid; a rotary support for the objects to be coated which is adapted to be raised and lowered with respect to, and to be immersed in, said tank; a baffle for intercepting the excess liquid thrown off said support as it rotates, said baffle being adapted also to be raised and lowered independently of said support with respect to, and to be immersed in, said tank; and mechanism for raising and lowering the baffle with respect to the tank and with respect to said support.

2. An apparatus for coating objects with a liquid, comprising a fixed tank for the liquid; a rotary support for the objects to be coated which is adapted to be raised and lowered with respect to, and to be immersed in, said tank; an annular baffle for intercepting the excess liquid thrown off said support as it rotates, said baffle being adapted also to be raised and lowered independently of said support with respect to, and to be immersed in, said tank; and mechanism for raising and lowering the baffle with respect to the tank and with respect to said support.

3. An apparatus for coating objects with a liquid, comprising a fixed tank for the liquid; a rotary support for the objects to be coated which is adapted to be raised and lowered with respect to, and to be immersed in, said tank; an annular baffle for intercepting the excess liquid thrown off said support as it rotates, said baffle being adapted also to be raised and lowered independently of said support with respect to, and to be immersed in, said tank; means for balancing the weight of said baffle, and mechanism for raising and lowering the baffle with respect to the tank and with respect to said support.

4. An apparatus for coating objects with a liquid, comprising a fixed tank for the liquid; a rotary support for the objects to be coated which is adapted to be raised and lowered with respect to, and to be immersed in, said tank; and an annular baffle for intercepting the excess liquid thrown off said support as it rotates, said baffle being adapted also to be raised and lowered independently of said support with respect to, and to be immersed in, said tank, and said baffle having overlapping elements with air spaces between them; and mechanism for raising and lowering the baffle with respect to the tank and with respect to said support.

5. An apparatus for coating objects with a liquid, comprising a fixed tank for the liquid; a rotary support for the objects to be coated which is adapted to be raised and lowered with respect to, and to be immersed in, said tank; an annular baffle for intercepting the excess liquid thrown off said support as it rotates, said baffle being adapted also to be raised and lowered independently of said support with respect to, and to be immersed in, said tank; a frame on said baffle, rods and guiding sleeves for guiding said baffle as it moves; balance weights connected to said frame for balancing the weight of the frame and the baffle; and mechanism for raising and lowering the baffle with respect to the tank and with respect to said support.

BRUNO NIER.